3,597,460
TRANSITION METAL COMPLEXES
David Thomas Thompson, Runcorn, England, assignor to Imperial Chemical Industries Limited, London, England
No Drawing. Filed Apr. 8, 1968, Ser. No. 719,688
Claims priority, application Great Britain, Apr. 17, 1967, 17,527/67
Int. Cl. C07f 15/00, 11/00, 15/06
U.S. Cl. 260—429
9 Claims

ABSTRACT OF THE DISCLOSURE

A process for preparing polynuclear transition metal complexes which comprises contacting a first transition metal complex which contains one or more hydrocarbon ligands with a second transition metal complex which contains one or more ligands which contain or consist of a hydrogen atom or atoms capable of reacting with a hydrocarbons ligand of the first complex to liberate a free hydrocarbon and form the polynuclear product.

---

This invention relates to a process for preparing polynuclear transition metal complexes, and in particular to complexes containing bridged ligands.

Our British patent application 34740/65 describes dinuclear bridged transition metal complexes, in which the metals are different, a process for this preparation and their use as catalysts.

We have now devised a new process for the preparation of polynuclear bridged transition metal complexes in which the metals may all be the same or may be different. The term "polynuclear" is used for the purpose of the present specification to denote complexes containing in the molecule two or more transition metal atoms. Polynuclear complexes may themselves be used as starting materials in the process of our invention for the preparation of more complex polynuclear transition metal complexes.

According to the present invention, a proces for preparing polynuclear transition metal complexes comprises contacting a first transition metal complex which contains one or more hydrocarbon ligands with a second transition metal complex which contains one or more ligands which contain or consist of a hydrogen atom or atoms capable of reacting with a hydrocarbon ligand of the former complex to liberate a free hydrocarbon and form the polynuclear product.

The transition metal complex which contains one or more hydrocarbon ligands will hereinafter be referred to as the "hydrocarbon complex." Similarly, the second transition metal complex which contains one or more ligands which contain or consist of a hydrogen atom will be referred to as the "hydrogen-containing complex."

By a "transition metal" we mean a metal having an atomic number from 22 to 28, 40 to 46 or 72 to 78. We prefer that the metal or metals of the hydrocarbon complex is or are selected from Groups VI, VII and VIII of the Periodic Table of Elements, especially molybdenum, manganese, nickel, cobalt, rhodium, palladium and platinum. We also prefer that the metal or metals of the hydrogen-containing complex is or are selected from Groups VI, VII and VIII of the Periodic Table, especially chromium, molybdenum, tungsten, manganese and iron.

The hydrocarbon ligand or ligands may be saturated, for example as in alkyl ligands, or unsaturated, for example a $\pi$-olefin or $\pi$-allyl ligand.

The hydrogen atom or atoms in the hydrogen-containing complex may be linked to the metal directly as in simple hydrido ligands or indirectly as in secondary phosphine ligands, especially dialkyl or diaryl phosphines. Instead of phosphines, equivalent secondary arsine or stibine ligands may be used. Carbonyl ligands may also be present, as in carbonyl hydrides and carbonyl phosphines.

The reaction is believed to proceed by elimination of the hydrocarbon ligand together with the hydrogen from the hydrogen-containing complex as a free hydrocarbon, the remaining residues condensing to form a single compound. Free hydrocarbon may be detected in the reaction products for example, by gas-liquid chromatography.

It will be appreciated that the process of the invention may be used to prepare dinuclear transition metal complexes in which the metal atoms are the same or different, by reacting a mononuclear hydrocarbon complex containing a single hydrocarbon ligand with a hydrogen-containing complex also containing a single reactive ligand. For example, $\pi$-allylmanganese tetracarbonyl may be reacted with hydridomanganese pentacarbonyl or diphenylphosphine-iron tetracarbonyl when propylene is evolved and dinuclear complexes are obtained containing two manganese atoms, or a manganese and iron atom respectively. Trinuclear complexes may be prepared by reacting a mononuclear hydrocarbon complex having two hydrocarbon ligands with a hydrogen-containing complex having a single reactive ligand.

Tetranuclear complexes may be prepared from dinuclear hydrocarbon complexes in which at least one hydrocarbon ligand is attached to each metal atoms, by reaction with a mono-functional hydrogen-containing complex. For example $\pi$-allyl palladium chloride dimer reacts with diphenylphosphinechromium pentacarbonyl to form a tetranuclear complex with the elimination of propylene. The extension of the method to allow the preparation of complexes containing larger numbers of metal atoms depends solely upon the availability of suitable starting materials.

The reactions may be carried out by contacting the appropriate metal complexes in an inert solvent such as ethers or aromatic solvents. Suitable solvents are tetrahydrofuran and benzene. The reactions are usually rapid and are frequently accompanied by a colour change. The temperature of reaction is conveniently room tempearture, though higher or lower temperatures may be used. Precautions should be taken to avoid contact with air and moisture during the reaction, for example by conducting the preparation in a nitrogen atmosphere. The products, which are generally air-stable may be purified and isolated by conventional techniques such as filtration, crystallisation and chromatography.

Complexes produced by the process of the present invention are useful as catalysts in a wide range of organic processes. Multi-purpose catalysts may be devised containing different metals, each of which may perform its specific function. Alternatively, complexes may be prepared for use as catalysts, in which a high cost metal such as platinum or palladium is combined in a complex with a cheaper metal, such as iron. It is often found that the dilution of the high cost metal is achieved without being accompanied by a corresponding loss of catalytic activity.

For use as catalysts the complexes may be used after purification though it is often convenient to use the crude product from the preparative reaction, without intermediate isolation of the specific complexes.

Hydrogenation reactions may be carried out by contacting an unsaturated organic substrate with hydrogen, in the presence of a complex containing platinum or palladium, prepared by the process of the present invention. The operating pressure is preferably above 50 atmospheres; the temperature is preferably maintained above 100° C. but below the temperature at which the catalyst decomposes.

The reaction may be carried out batchwise in a conventional autoclave or continuously in a suitable reactor. The reaction may be followed by measuring hydrogen uptake or by periodic analysis of samples taken from the reactor.

It is preferred to introduce the catalyst into the reaction zone as a solution or suspension in a solvent which is liquid under the conditions of the hydrogenation reaction. Suitable solvents are for example, ethers, hydrocarbons which may comprise the solvents used in the catalyst perparation, the substrate which is to be hydrogenated or the products of the hydrogenation reaction.

Catalyst concentrations are not generally critical, provided that they are such that the reaction proceeds at an acceptable rate and the reaction solution is homogeneous, i.e. the solubility of the catalyst is not exceeded. In practice, the upper limit of concentration is dictated by economic considerations.

The hydrogenation process will be illustrated by examples following the description of the preparation of the catalysts used.

The invention is illustrated by, but not limited to the following examples, in which all reactions were carried out under nitrogen. Solvents were purified and dried as follows: tetrahydrofuran was distilled from sodium and benzophenone under nitrogen and benzene and toluene were dried over sodium.

EXAMPLE 1

π-Allylpalladium chloride dimer (0.2 g.) and diphenylphosphine-chromium pentacarbonyl (0.42 g.) were dissolved in tetrahydrofuran (THF) (50 ml.) under nitrogen. A colour change to yellow-brown occured after 1 hour and after 3 hours colour was red-brown. After standing overnight a black solid was removed by filtration. The red filtrate was evaporated under reduced pressure to low bulk and petrol added to start crystallisation. The red powder obtained had infra-red absorption bands (Nujol mull) at 1955 and 2035 cm.$^{-1}$. Propylene was evolved during the reaction and this was identified by gas/liquid chromatographic (G.L.C.) analysis of the reaction solution. Analytical data is consistent with the product structure below.

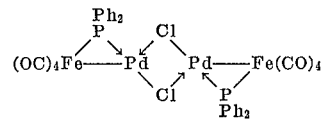

EXAMPLE 2

Ethyleneplatinum chloride dimer (0.2 g.) and diphenylphosphineiron tetracarbonyl (0.24 g.) were allowed to react in (THF) (40 ml.) under nitrogen. The solution quickly changed to dark brown. Evaporation to low bulk under reduced pressure and addition of petrol afforded a brown solid complex (0.23 g.) containing platinum and iron and having infra-red absorption bands (Nujol mull) at 1980, 2005, 2055 cm.$^{-1}$.

EXAMPLE 3

π-Allylpalladium chloride dimer (0.1 g.) and diphenylphosphineiron tetracarbonyl (0.195 g.) were dissolved in tetrahydrofuran under nitrogen. The solution changed from yellow to red in about 5 minutes. The solution was allowed to stand for 3 days and most of the solvent removed under reduced pressure. Light petroleum was added to give the product as a red solid (0.25 g.) M.P. 90–95° having infra-red absorption bands (Nujol mull) at 955, 2000 and 2030 cm.$^{-1}$. Molecular weight: Found, 1008; Required 990. The properties of this product were consistent with the formula given below.

The product was further recrystallised from toluene and obtained as red crystals having one molecule of toluene of crystallisation.

Elemental analysis.—Found (percent): C, 43.1; H, 3.1; Cl, 6.7; Fe, 10.2; P, 6.3; Pd, 18.7. Required for $C_{39}H_{28}Cl_2Fe_2O_8P_2Pd_2$ (percent): C, 43.0; H, 2.6; Cl, 6.5; Fe, 10.2; P, 5.7; Pd, 19.6.

Propylene was evolved during the reaction and was identified by G.L.C. analysis of the reaction solution.

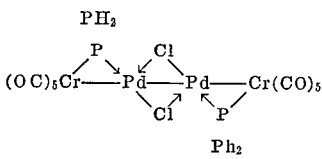

The above structural formula has been confirmed by X-ray crystallographic analysis.

Hydrogenation

The products of Examples 1 and 3 were tested as hydrogenation catalysts, using a mixed substrate consisting of hexyne-1 in benzene solution. Catalyst was introduced at a concentration of 10 parts per million calculated as moles metal per mole substrate (including benzene). The solutions were introduced into an autoclave which was sealed, and pressured with hydrogen. After heating at 175° C., under 100 atmospheres pressure for 1 hour, only 24 and 4% hexyne-1 remained, using catalysts of Examples 1 and 3 respectively.

EXAMPLE 4

Cyclooctadienepalladium chloride (0.20 g.) and diphenylphosphineiron tetracarbonyl (0.2 mg.) were stirred in tetrahydrofuran. A rapid reaction took place and the mixture became yellow-orange and then red. A little black solid (5 mg.) was removed by filtration. The red filtrate was evaporated to small valume and methylcyclohexane added to give a red powder (0.30 g.) decomp. 230°. Elemental analysis (percent): C, 34.0; H, 3.6; Cl, 15.9; P, 6.7; Pd, 18.2; Fe, 14.3, having carbonyl absorption bands (Nujol) at 1970 (inflex.) 2000, 2010, 2080 cm.$^{-1}$. Proton magnetic resonance spectroscopy showed that no cyclooctadiene remained in the solid product, although it was present in the reaction solution. The product is believed to be identical with that of Example 3.

EXAMPLE 5

Dimeric diallylchlororhodium (0.3 g.) and diphenylphosphineiron tetracarbonyl (0.975 g.) were stirred in benzene (80 ml.). The yellow solution became dark brown within 1 hr. G.L.C. analysis showed that both propylene and biallyl were evolved. Most of the solvent was removed and the residue treated with benzene, filtered and the mother liquor evaporated to give a red-brown powder having infra-red carbonyl absorptions (Nujol) at 1815, 1960, 1985, 2000 and 2050 cm.$^{-1}$. Elemental analysis (percent): C, 46.7; H, 3.7; Cl, 3.6; P, 8.1; Fe, 11.0; Ph, 9.9.

EXAMPLE 6

Molar equivalents of dimeric diallychlororhodium and hydridomanganese pentacarbonyl were stirred in tetrahydrofuran. G.L.C. analysis showed that propylene was evolved. The yellow solution rapidly turned to red. Evaporation of the mother liquor and addition of light petroleum afforded a solid product having infra-red carbonyl absorptions (Nujol) at 1910 (s., b.), 1985 (w.), 2003 (m.) and 2060 (w.) cm.$^{-1}$.

EXAMPLE 7

π-Allylmanganese tetracarbonyl (0.5 g.) and hydridomanganese pentacarbonyl (1 mole equivalent) in tetrahydrofuran were stirred under nitrogen. G.L.C. analysis showed that proplene was evolved. Evaporation of the mother liquor and addition of light petroleum gave a yellow solid (0.134 g.) decomp. 130–135°, having infrared carbonyl absorptions (Nujol) at 1860 (m., s.), 1900 (s.) and 1990 (s.) and 2040 (m., s.) cm.$^{-1}$,

EXAMPLE 8

π - Cyclopentadienyltriphenylphosphinenickel methyl (0.25 g.) and hydridomanganese pentacrabonyl (1 mole equivalent) were stirred in tetrahydrofuran. G.L.C. analysis showed that methane was evolved. Evaporation of the solvent and addition of light petroleum gave a yellow brown solid (0.13 g.) decomp. 150° having carbonyl absorptions (Nujol) in the infra-red at 1905 (s., b.), 1985 (m., w.), and 2030 (m., a.) cm.$^{-1}$.

EXAMPLE 9

π-Allylmolybdenumdicarbonylbipyridyl chloride and hydridomanganese pentacarbonyl (1 mole equivalent of each) were stirred in methyl ethyl ketone. G.L.C. analysis showed that propylene was evolved, but the starting material was not entirely soluble and contaminated the product.

EXAMPLE 10

π-Allylmanganese tetracarbonyl (1.04 g.) and diphenylphosphineiron tetracarbonyl (1.77 g.) were stirred and refluxed in toluene for 4 hrs. Evaporation of the solvent gave an oil which was dissolved in ether and hexane added. Eether was removed under vacuum and the red-brown solid removed by filtration. The product had M.P. 160–165° and its mass spectrum had a parent ion m/e 519 and peaks at 295(–8CO) 239, 183, 163, 142, 167, 78, 55, consistent with PPh$_2$MnFe(CO)$_8$.

*Elemental analysis.*—Found (percent): C, 46.1; H, 2.05. C$_{20}$H$_{10}$FeMnO$_8$P. Required (percent): C, 46.1; H, 1.9. The analytical data is consistent with the structural formula:

$$(OC)_4Mn\underset{P}{\overset{Ph_2}{\diagup\diagdown}}Fe(CO)_4$$

EXAMPLE 11

π-Allylcobalt tricarbonyl (2.6 g.) and diphenylphosphineiron tetracarbonyl (5.0 g.) were stirred and heated at 80° C. in toluene for 3 hours. Evaporation of the solvent under reduced pressure gave a red-brown oil. Addition of methylcyclohexane and purification by chromatography on silica gel gave a solid having carbonyl absorbtion bands at 2070 (m.) 2050 (m.) 2020 (s.) 2000 (s.) 1970 (s.) and 1920 (s.). Recrystallisation from tetrahydrofuran/methylcyclohexane gave a solid for which the elemental analysis was: Found (percent): C, 46.2; H, 3.8; P, 7.7; Fe, 10.9. C$_{19}$H$_{19}$CoFeO$_7$P. Required (percent): C, 45.9; H, 2.0; P, 6.4; Fe, 11.2.

Analytical data is consistent with the structural formula:

$$(OC)_4Fe\underset{P}{\overset{Ph_2}{\diagup\diagdown}}Co(CO)_3$$

EXAMPLE 12

π - Cyclopentadienyltriphenylphosphinenickel methyl (0.20 g.) and diphenylphosphineiron tetracarbonyl (0.18 g.) were stirred in tetrahydrofuran. G.L.C. analysis showed that methane was evolved. The yellow-brown solution was evaporated to small volume under reduced pressure and a petroleum hydrocarbon solvent was added to initiate product crystallisation.

The product was obtained as a light brown powder (0.12 g.) having carbonyl absorbtion bands (Nujol) at 1930 (s.), 1970 (m.) and 2040 cm.$^{-1}$ and proton magnetic resonance peaks at 2.14 and 2.87π.

*Elemental analysis.*—Found (percent): Ni, 7.4; Fe, 7.7. C$_{39}$H$_{40}$NiFeO$_4$P$_2$. Required (percent): Ni, 7.9; Fe, 7.7.

Analytical data is consistent with the structural formula:

[Cp]—Ni----P→Fe(CO)$_4$
       |    |
      PPh$_3$ Ph$_2$

EXAMPLE 13

Diphenylphosphinetungsten pentacarbonyl (0.79 g.) and π-allylpalladium chloride dimer (0.20 g.) were stirred in benzene for an hour. The yellow solution rapidly turned red and was finally a deep red-brown colour. G.L.C. analysis showed that propylene was evolved. The resulting solution was reduced to small volume under reduced pressure and methylcyclohexane was added to start crystallisation. The product (0.504 g.) was obtained as a red-brown powder having carbonyl absorbtions (Nujol) at 1935 (s., b.) 2040 (w.) and 2060 (w.) cm.$^{-1}$.

*Elemental analysis.*—Found (percent): C, 29.8; H, 2.4; Cl, 6.7; P, 4.1. C$_{34}$H$_{20}$Cl$_2$P$_2$Pd$_2$O$_{10}$W$_2$. Required (percent): C, 31.3; H, 1.5; Cl, 5.4; P, 4.8.

Analytical data is consistent with the structural formula:

$$(OC)_5W\text{—}Pd\underset{Cl}{\overset{Ph_2\diagdown P\diagup Cl}{}}Pd\text{—}W(CO)_5$$
$$\phantom{(OC)_5W\text{—}Pd}\underset{P}{\phantom{x}}\phantom{xxxx}$$
$$\phantom{xxxxxxxxxxx}Ph_2$$

EXAMPLE 14

Diphenylphosphinemolybdenum pentacarbonyl (0.46 g.) and π-allylpalladium chloride dimer (0.20 g.) were stirred in benzene. An immediate reaction occurred and the solution became dark brown. There was some precipitation after ½ hour. The solution was reduced in volume and light petroleum was added to give a dark brown powder (0.34 g.) having carbonyl infra-red absorbtion bands (Nujol) at 1840 (s.) and 1940 (s.) cm.$^{-1}$.

The analytical data is consistent with the following structure:

$$(OC)_4Mo\text{—}Pd\underset{Cl}{\overset{Ph_2\phantom{xx}Ph_2}{P\phantom{xx}P}}Pd\text{—}Mo(CO)_4$$

What I claim is:

1. A process for preparing a polynuclear transition metal complex which comprises contacting a first transition metal complex wherein the metal is selected from the metals of Groups VI, VII and VIII of the Periodic Table and which contains an alkyl, olefin or allyl ligand with a second transition metal complex wherein the metal is selected from the metals of Groups VI, VII and VIII of the Periodic Table and which contains carbonyl moieties and a hydride, secondary alkyl or aryl phosphine, arsine or stibine moiety acting as a source of hydrogen which reacts with said ligand of the first complex to liberate a free hydrocarbon and form said polynuclear product.

2. A process according to claim 1 in which the metal of the first complex is platinum, palladium, molybdenum, manganese, nickel, cobalt or rhodium.

3. A process according to claim 1 in which the metal of the second complex is iron, chromium, molybdenum, tungsten or manganese.

4. A process according to claim 1 in which the ligand is ethylene or π-allyl.

5. A process according to claim 1 in which the ligand is cyclooctadiene or cyclopentadiene.

6. A process according to claim 1 in which the second complex contains a secondary dialkyl or diaryl phosphine ligand.

7. A process according to claim 1 when carried out in solution in an inert solvent.

8. A polynuclear transition metal complex containing in the molecule two or more transition metal atoms prepared by the process according to claim 1.

9. The process of claim 1 wherein the first transition metal complex is selected from the group consisting of:
(a) π-allyl palladium chloride dimer;

(b) ethylene platinum chloride dimer;
(c) cyclooctadiene palladium chloride;
(d) dimeric diallylchlororhodium;
(e) π-allylmanganese tetracarbonyl;
(f) π-cyclopentadienyltriphenylphosphinenickel methyl;
(g) π-allylmolybdenumdicarbonylbipyridyl chloride;
(h) π-allyl cobalt tricarbonyl;
and wherein the second transition metal complex is selected from the group consisting of:
(a) diphenylphosphine chromium pentacarbonyl;
(b) diphenylphosphine iron tetracarbonyl;
(c) hydrido manganese pentacarbonyl;
(d) diphenyl phosphine tungsten pentacarbonyl; and
(e) diphenyl phosphine molybdenum pentacarbonyl.

References Cited

UNITED STATES PATENTS

| | | | |
|---|---|---|---|
| 3,452,070 | 6/1969 | Thompson | 260—439 |
| 3,453,299 | 7/1969 | Claridge | 260—429 |

JAMES E. POER, Primary Examiner

A. P. DEMERS, Assistant Examiner

U.S. Cl. X.R.

252—429, 431; 260—438.5, 439, 676, 690